United States Patent [19]
Renken et al.

[11] Patent Number: 5,129,235
[45] Date of Patent: Jul. 14, 1992

[54] COMPARTMENTALIZED TRANSPORT REFRIGERATION SYSTEM

[75] Inventors: David J. Renken, Minneapolis; Robert D. Pfankuch, Chanhassen; Donald J. Bongaards, Shorewood, all of Minn.

[73] Assignee: Thermo King Corporation, Minneapolis, Minn.

[21] Appl. No.: 749,775

[22] Filed: Aug. 26, 1991

[51] Int. Cl.$^5$ .................................. B60H 1/32
[52] U.S. Cl. ........................ 62/200; 62/239; 454/90; 454/91
[58] Field of Search .............. 62/239, 442, 447, 199, 62/200

[56] References Cited

U.S. PATENT DOCUMENTS

| | | | |
|---|---|---|---|
| 2,633,714 | 4/1953 | Wehby | 62/239 X |
| 3,089,313 | 5/1963 | Fix | 62/239 |
| 4,065,587 | 11/1991 | Howland et al. | 62/200 X |
| 4,221,421 | 9/1980 | Bettker, Jr. et al. | 296/24 B |
| 4,551,986 | 11/1985 | Anderson et al. | 62/239 |
| 4,685,306 | 8/1987 | Howland et al. | 62/117 |
| 4,691,527 | 9/1987 | Skeda | 62/199 X |
| 4,706,468 | 11/1987 | Howland et al. | 62/199 |
| 4,711,095 | 12/1987 | Howland et al. | 62/117 |
| 4,712,383 | 12/1987 | Howland et al. | 62/200 |
| 4,726,196 | 2/1988 | Zajic | 62/239 |
| 4,741,175 | 5/1988 | Shellze | 62/442 |
| 4,896,512 | 1/1990 | Howland | 62/117 |
| 4,912,940 | 4/1990 | Anderson et al. | 62/239 |
| 4,932,219 | 6/1990 | Howland et al. | 62/174 |
| 5,054,295 | 10/1991 | Goulooze | 62/239 |

FOREIGN PATENT DOCUMENTS

2154309 9/1985 United Kingdom ............... 62/447

*Primary Examiner*—William E. Tapolcai
*Attorney, Agent, or Firm*—D. R. Lackey

[57] ABSTRACT

A vehicle (14) having first and second cargo spaces (32,34) to be conditioned by a transport refrigeration unit (12), with the vehicle having a front wall (24) and a rear wall (26). A partition (30) in the vehicle defines the first and second cargo spaces, which extend side-by-side from the front wall to the rear wall. The rear wall is provided with separate doors (36,38) for gaining access to the first and second cargo spaces. The transport refrigeration unit includes a frame (44) supporting first and second evaporator units (50,52). The frame and evaporator units are mounted on the outside front wall of the vehicle, with the first and second evaporator units being in air flow communication with the first and second cargo spaces, respectively, via suitable openings (40,42) in the front wall. Electrical control independently controls the first and second evaporator units to condition the air in the first and second cargo spaces.

8 Claims, 5 Drawing Sheets

COMPARTMENTALIZED TRANSPORT REFRIGERATION SYSTEM

TECHNICAL FIELD

The invention relates in general to refrigeration systems, and more specifically to compartmentalized transport refrigeration systems.

BACKGROUND ART

When more than one compartment of a compartmentalized truck or trailer is to be conditioned, a host refrigeration unit is conventionally mounted on a front wall of the truck or trailer, adjacent to a front compartment, and a remote evaporator unit is mounted in a rear compartment. The host refrigeration unit includes a condenser, and an evaporator for conditioning the air of a cargo space in the front compartment. The remote refrigeration unit includes an evaporator for conditioning the air of a cargo space in the rear compartment. U.S. Pat. Nos. 4,685,306; 4,706,468; 4,711,095; 4,712,383; 4,896,512; 4,912,940 and 4,932,219, which are assigned to the same assignee as the present application, all disclose compartmentalized transport refrigeration systems of the type described above.

The host-remote refrigeration arrangement adequately controls the temperatures of the cargo spaces in the associated compartments, but there are several disadvantages. For example, the host-remote refrigeration arrangement is costly to manufacture because it includes multiple components. The host-remote arrangement is difficult and time consuming to install because of the separate mounting of the host and remote refrigeration units, the separate electrical harness required for the remote unit, and the long hot gas, liquid and suction lines which must be run between the host and remote refrigeration units. The separate mounting and separate connections involved requires that the whole refrigeration system be evacuated and charged with refrigerant after installation on a truck or trailer. Since the system is not factory assembled and factory tested, in general it would be less reliable, as factory quality control procedures would not be applicable. The refrigerant hoses and electrical harness which connect the remote unit with the host unit are susceptible to damage and must be protected by special covers or special channels. Maintenance costs associated with such systems are relatively high because of added inspection for damage and refrigeration leaks, and associated repair costs when damage and/or refrigeration leaks are detected. A walk-in side door is normally provided on the truck or trailer for accessing the front compartment. A side door on a truck or trailer usually requires that products in the front compartment be loaded and unloaded by hand. Thus, it would be desirable, and it is an object of the present invention, to have a compartmentalized truck or trailer and associated transport refrigeration system for refrigerating the compartments which overcomes the disadvantages of the prior art compartmentalized truck and trailer arrangements.

SUMMARY OF THE INVENTION

Briefly, the present invention is a vehicle having first and second side-by-side cargo spaces to be conditioned by a transport refrigeration unit, with the vehicle being a truck or trailer having a bottom, a top, first and second side walls, a front wall and a rear wall, and a longitudinal axis extending between the front and rear walls which is parallel with the movement direction of the vehicle. A partition in the vehicle extends generally parallel with the longitudinal axis of the vehicle, between the front and rear walls, and from the bottom to the top thereof, with the partition dividing the vehicle into the first and second side-by-side cargo spaces.

The transport refrigeration unit includes a frame supporting first and second evaporator units. The frame and first and second evaporator units are mounted on the front wall of the vehicle, with the first and second evaporator units being in air flow communication with the first and second cargo spaces, respectively. Control means is provided for independently conditioning the air in the first and second cargo spaces via the first and second evaporator units.

The disclosed side-by-side transport refrigeration system has many advantages over the prior art in-line compartmentalized refrigeration systems, including a major advantage of having only a single unit to manufacture and install, greatly reducing manufacturing and installation costs. The complete system is assembled and tested in the factory, improving reliability. The need for the prior art wire harness and connecting hoses and wire harness is eliminated. Also, since the single unit is charged with refrigerant when manufactured, the evacuation and charging steps after installation on a vehicle, required in prior art host-remote installations, are also eliminated. The side-by-side dual evaporator arrangement of the invention is more reliable, and maintenance is reduced, again because the long wiring harness and long refrigerant hoses, which must be routed through the body of the compartmentalized vehicle, are not required. Further, since the side-by-side refrigerated compartments are accessible from rear doors of the truck or trailer, products may be loaded and unloaded into both compartments with fork lifts, or other loading machines.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
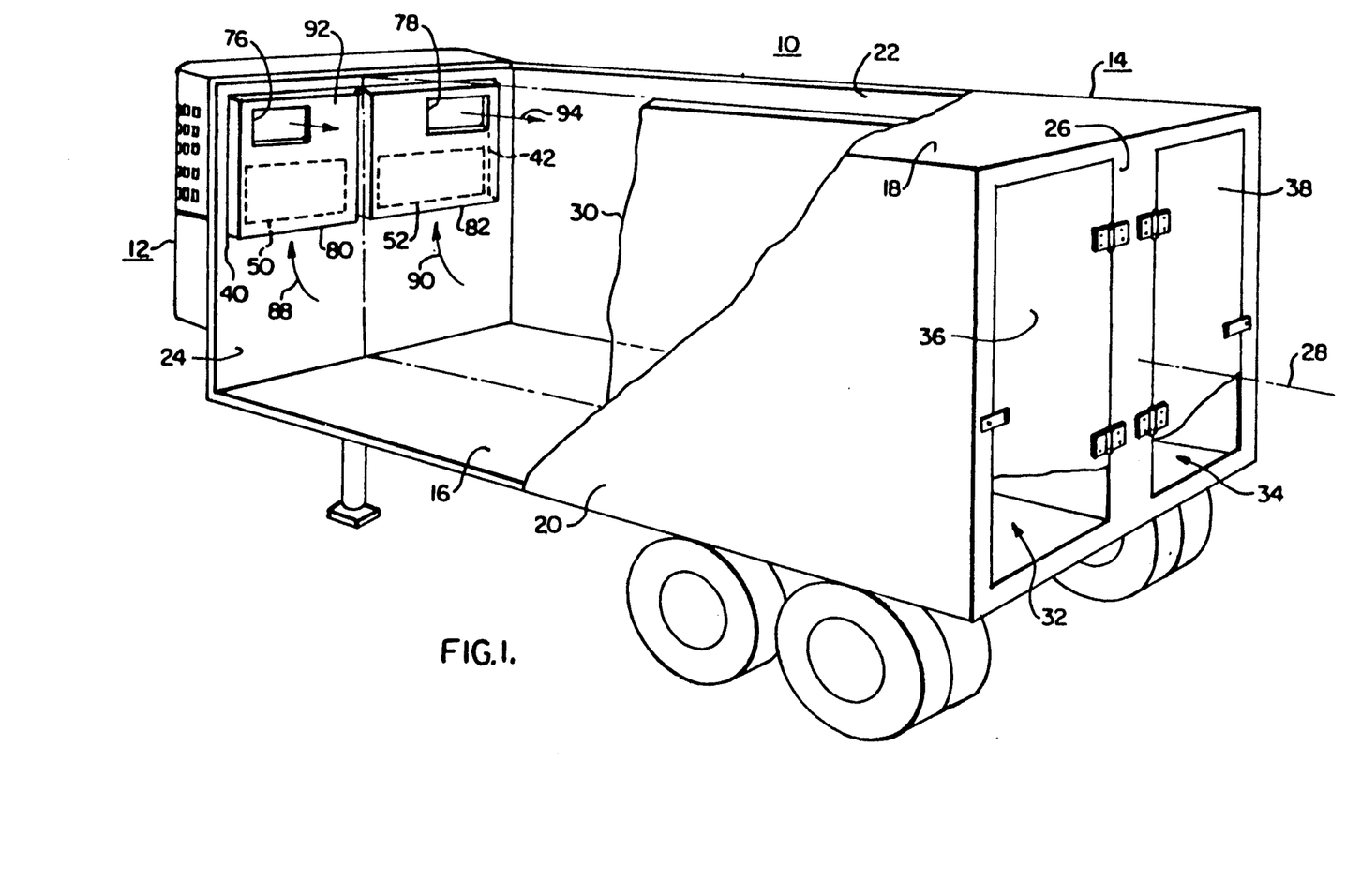
FIG. 1 is a perspective view of a transport refrigeration system and associated compartmentalized vehicle constructed according to the teachings of the invention.

Referring now to the drawings, and to FIG. 1 in particular, there is shown a compartmentalized transport refrigeration system 10 constructed according to the teachings of the invention. Transport refrigeration system 10 includes a dual temperature refrigeration unit 12 and an associated vehicle 14, such as a trailer illustrated in Figure 1, or a truck. Trailer 14 includes a bottom 16, a top 18, first and second side walls 20 and 22, a front wall 24, and rear wall 26, with a longitudinal axis 28 extending between the front and rear walls, parallel with the intended travel direction of trailer 14. A partition 30 extends between front and rear walls 24 and 26, and from the bottom 16 to the top 18, with a longitudinal axis through partition 30 being parallel with the longitudinal axis 28 of vehicle 14. As illustrated, partition 30 may divide trailer 14 into first and second substantially equal cargo spaces 32 and 34, respectively, whose temperature is to be controlled by dual temperature refrigeration unit 12; or unequal cargo spaces may be created by partition 30, as desired. The rear wall 26 is provided with first and second doors 36 and 38 for gaining access to the first and second cargo spaces 32 and 34, respectively. The front wall 24 defines first and second openings 40 and 42 which communicate with the first and second compartments or cargo spaces 32 and 34, respectively.

Figure 2:
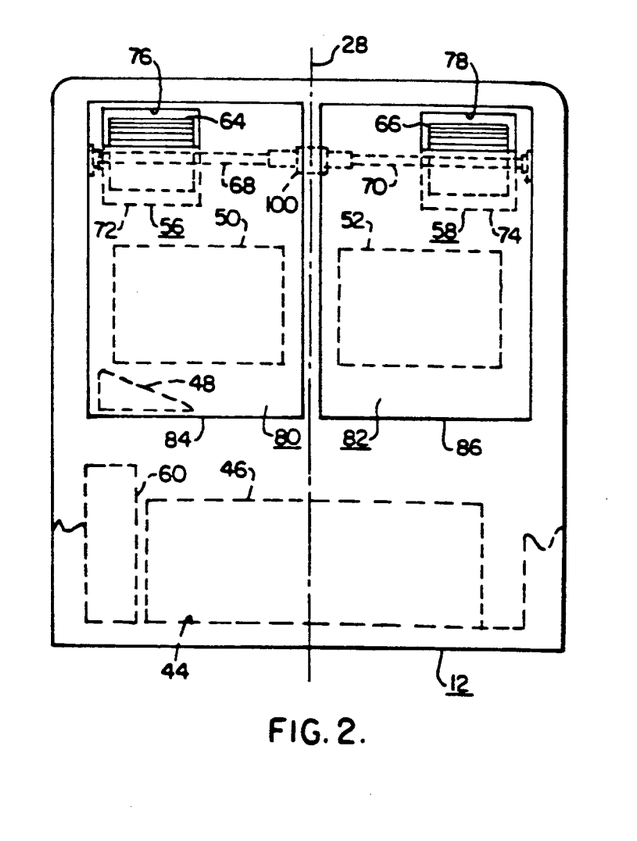
FIG. 2 is a rear elevational view of a dual-temperature trailer-type transport refrigeration unit constructed according to a first embodiment of the invention.
Figure 3:
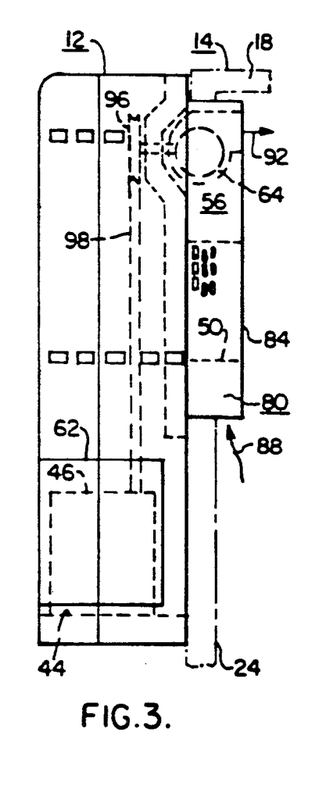
FIG. 3 is a side elevational view of the dual-temperature refrigeration unit shown in FIG. 2.
Figure 4:
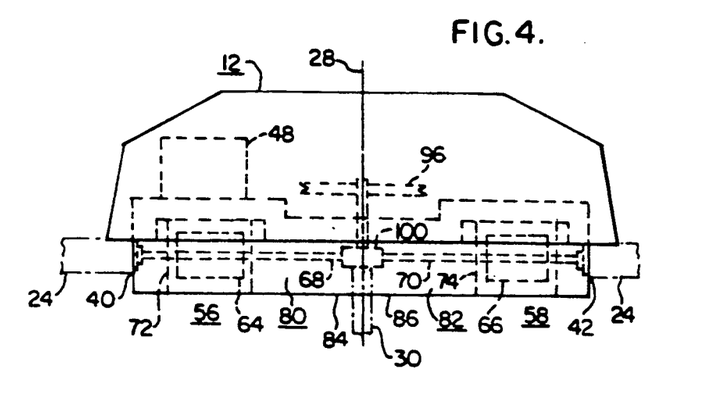
FIG. 4 is a plan view of the dual-temperature transport refrigeration unit shown in FIG. 2.

FIGS. 2, 3 and 4 are rear and end elevational views, and plan views, respectively, of a trailer-type transport refrigeration unit 12 which may be used for the transport refrigeration unit 12 shown in FIG. 1. For purposes of example, except for modifications to be hereinafter described, transport refrigeration unit 12 may be constructed according to the teachings of U.S Pat. No. 4,551,986, which is assigned to the same assignee as the present application, and thus only those components important to the present invention are shown in detail.

More specifically, transport refrigeration unit 12 includes a single frame 44 which supports all of the components of the refrigeration unit 12, including a compressor and prime mover, such as a Diesel engine, with the compressor-prime mover package being shown generally at 46. Refrigeration unit 12 also includes a single condenser 48, first and second evaporator units 50 and 52, respectively, an air delivery system 54 for the first and second evaporator units 50 and 52, which includes first and second radial flow fans 56 and 58, and electrical control 60 for controlling the various elements of the transport refrigeration unit 12. Electrical control 60 is accessible via a door 62 shown in FIG. 3.

The radial flow fans 56 and 58 of evaporator air delivery system 54 include centrifugal blowers comprising impellers 64 and 66 mounted on shafts 68 and 70. Impellers 64 and 66 are encased in spiral or scroll housings 72 and 74 having axial inlets, and peripheral outlets 76 and 78. When transport refrigeration unit 12 is mounted on the outside front wall 24 of vehicle 14, outlets 76 and 78 are in air flow communication with the first and second compartments or cargo spaces 32 and 34, respectively.

First and second separate evaporator plenums 80 and 82 are defined by housings 84 and 86, respectively. Housings 84 and 86 extend through the front wall 24 of vehicle 14, and for a short dimension into the first and second cargo spaces 32 and 34. Housings 84 and 86 define openings at their lower ends for receiving air, indicated by arrows 88 and 90, drawn from cargo spaces 32 and 34 by air delivery system 54. Return air 88 and 90 is directed through the first and second evaporator units 50 and 52, into the axial inlets of radial flow fans 56 and 58. Air conditioned by evaporator units 50 and 52, indicated by arrows 92 and 94, is directed back into cargo spaces 32 and 34 via the outlets 76 and 78 of the radial flow fans 56 and 58.

In a preferred embodiment, shafts 68 and 70 of the radial flow fans 56 and 58 may both be driven by a pulley 96 linked with the prime mover of package 46 via a belt 98. A right angle gear arrangement or universal 100 converts rotary motion of pulley 96 to rotation of shafts 68 and 70.

Figure 5:
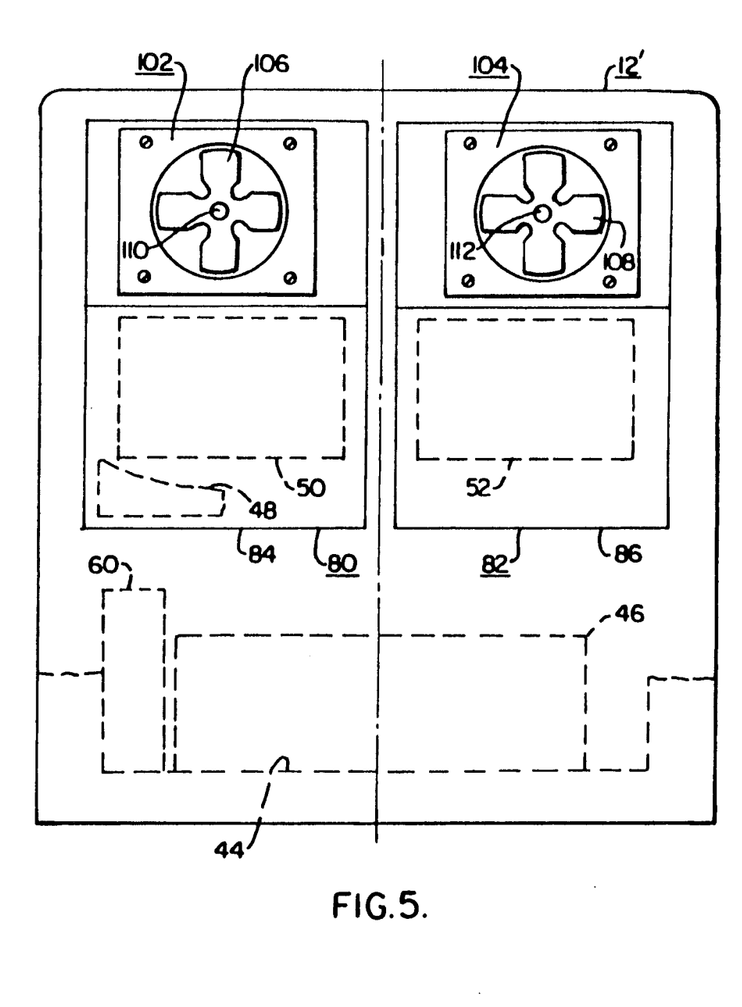
FIG. 5 is a rear elevational view of a dual-temperature trailer-type transport refrigeration unit constructed according to another embodiment of the invention.
Figure 6:
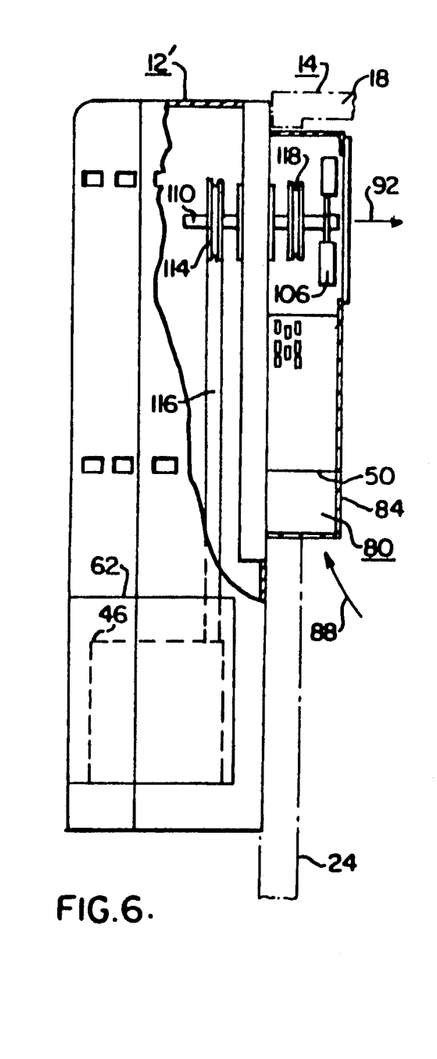
FIG. 6 is a side elevational view of the dual-temperature transport refrigeration unit shown in FIG. 5.

FIGS. 5 and 6 are rear and end elevational views of a transport refrigeration system 12' constructed according to another embodiment of the invention. Transport refrigeration system 12' is a trailer-type unit similar to transport refrigeration system 12, except first and second axial flow fans 102 and 104 are used instead of the radial flow fans 56 and 58 of the first embodiment. Like reference numerals in the Figures of the two embodiments indicate like components, and they will not be described again relative to the axial flow embodiment of FIGS. 5 and 6. The first and second axial flow fans 102 and 104 include fan blade assemblies 106 and 108 mounted on shafts 110 and 112. An exemplary drive arrangement includes shaft 110 being elongated by a dimension sufficient to support a pulley 114 linked to the prime mover of package 46 via a belt 116. Shaft 110 includes a second pulley 118 linked to a similar pulley on shaft 112 via a suitable belt.

FIG. 6 is a perspective view of a truck-type dual temperature transport refrigeration unit 120, with only an evaporator portion 122 of the single, self-contained unit 120 being fully shown, as the condenser portion 124 may be conventional. It will now be assumed that the vehicle 14 shown in FIG. 1 is a truck instead of a trailer, and thus the same reference numerals will be used to identify the two cargo spaces 32 and 34 to be conditioned.

The evaporator portion 122 includes first and second evaporator units 126 and 128, which may be split and vertically stacked, as illustrated, with evaporator unit 126 having first and second coils 130 and 132, and with evaporator unit 128 having first and second coils 134 and 136; or, a single thick multi-row single evaporator coil may be used for each evaporator unit 126 and 128, as desired. The coils of each of the first and second evaporator units, whether single or split, include first and second substantially vertically oriented opposite sides, such as first and second sides 135 and 137 associated with evaporator unit 126, and first and second sides 135' and 137' associated with evaporator unit 128, with the first and second sides respectively functioning as air inlet and air outlet sides.

Evaporator portion 122 includes a housing 138 which defines first and second evaporator plenums 140 and 142. The first evaporator plenum 140 defines an air inlet 144 adjacent to the air inlet sides 135 of the evaporator coils, for receiving return air, indicated by arrow 146, from cargo space 32, and the second evaporator plenum 142 defines an air inlet 148 adjacent to the air inlet sides 135' of the evaporator coils, for receiving return air, indicated by arrow 150, from cargo space 34. Housing 138 also defines first and second air outlets 152 and 154, respectively, adjacent to the air outlet sides 137 of 137' of the evaporator coils, through which conditioned air, indicated by arrows 156 and 158, is discharged into cargo spaces 32 and 34.

Unlike conventional prior art truck-type transport refrigeration units, unit 120 utilizes an air delivery system 160 mounted between the air outlet side 137 of the first evaporator unit 126 and the first air outlet 152; and, between the air outlet side 137' of the second evaporator unit 128 and the second air outlet 154. Thus, instead of forcing air through the evaporator coils 130, 132, 134 and 136, air is drawn horizontally through the Coils and the air delivery system 160 discharges the conditioned air 156 and 158 directly and horizontally into the cargo spaces 32 and 34.

In a preferred embodiment of the invention, air delivery system 160 includes first and second radial flow fans 162 and 164 in the form of centrifugal blowers having impellers 166 and 168 respectively mounted on shafts 170 and 172. Radial flow fans 162 and 164 further include housings 174 and 176 having axial inlets, and the housings have peripheral outlets which are respectively connected to outlets 152 and 154. The axes of shafts 170 and 172 are parallel with the longitudinal axis 28 of the associated vehicle 10.

Radial flow fans 162 and 164 are belt driven, from an associated compressor prime mover, by suitable extensions of drive shafts 170 and 172. For example, shaft 170 may include a pulley 178, and a fan shaft 180 which includes flexible couplers 182 and 184 Fan shaft 180 extends through the first evaporator unit 126, such as between the split coils 130 and 132. In like manner, shaft 172 may include a pulley 186, and a fan shaft 188 which includes flexible couplers 190 and 192. Fan shaft 188 extends through the second evaporator unit 128, such as between the split coils 134 and 136.

The evaporator outlet blower arrangement for truck refrigeration unit 120 provides several advantages over the prior art evaporator fans which push air through the evaporator coils. Side-by-side dual temperature units require the high velocity outlet airflow that radial flow fans can provide, because the cargo spaces 32 and 34 are much longer than the prior art in-line multi-temperature units. The outlet airflow indicated by arrows 156 and 158 should be able to reach the back of the cargo spaces 32 and 34 of a truck in about 1 second. Outlet radial flow fans 162 and 164 can draw air through a thick multi-row evaporator coil, or split coils, better than fans can push air through the same coils. The outlet blower arrangement also provides room in the front of the evaporator coils, that would normally be occupied by propeller fans, for the extra check valves, solenoid valves, and refrigeration tubing required by dual temperature units. The extra space even allows room for each evaporator unit 126 and 128 to have its own heat exchanger, as will be described relative to FIG. 9. Outlet mounted centrifugal blowers can provide high volume, high velocity air flow without resorting to costly electric fan motors. A belt drive system is more efficient, more reliable, and costs substantially less than a system using electric fan motors. Finally, the high volume, high velocity outlet airflow provided by outlet centrifugal blowers can be directed to the back of a long cargo area without the use of chutes. Chutes increase the cost of cargo containers and are easily damaged, increasing the maintenance costs.

Figure 7:
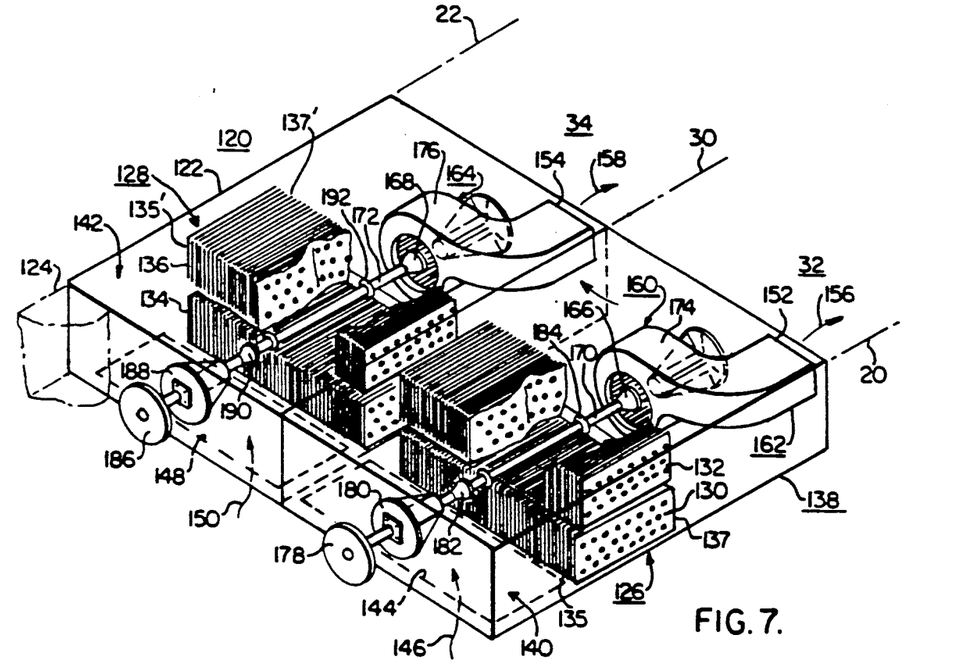
FIG. 7 is a perspective view of a dual-temperature truck-type transport refrigeration unit constructed according to an embodiment of the invention.
Figure 8:
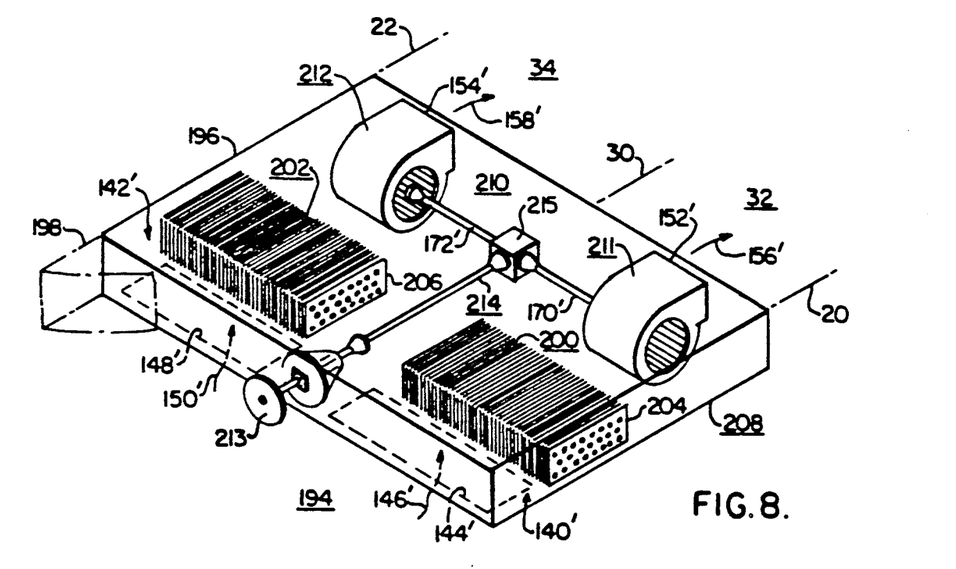
FIG. 8 is a perspective view of a dual-temperature truck-type transport refrigeration unit constructed according to another embodiment of the invention.

FIG. 7 is a perspective view of a truck-type dual temperature transport refrigeration unit 194 constructed according to another embodiment of the invention, with only an evaporator portion 196 of the single, self-contained unit 194 being fully shown, as the condenser portion 198 may be conventional.

The evaporator portion 196 includes first and second evaporator units 200 and 202, which may be split and vertically stacked, as in unit 120 shown in FIG. 6; or, as illustrated, single thick multi-row single evaporator coils 204 and 206 may be used for each evaporator unit 200 and 202, as desired. Unit 194 includes a housing 208 which is similar to housing 138, with like reference numerals except for a prime mark indicating like functions which will not be described again in detail. Unit 194 has an outlet mounted air delivery unit 210 having first and second radial flow fans 211 and 212 which are similar to radial flow fans 162 and 164 in the FIG. 6 embodiment, except the axes of their associated drive shafts 170' and 172' are aligned with one another, perpendicular to the longitudinal axis 28 of vehicle 14, similar to the arrangement of the trailer type unit 12 shown in Figures 2, 3 and 4. A single pulley 213 suitably coupled to the compressor prime mover drives a fan shaft arrangement 214 which extends between the first and second evaporator units 204 and 206, terminating in a universal 215 which is coupled to the drive shafts 170' and 172'. The embodiment of FIG. 7 has the same advantages as the FIG. 6 embodiment.

While FIGS. 6 and 7 set forth the preferred embodiments for the outlet mounted air delivery system for truck-type refrigeration units, it would also be practical for the outlet mounted air delivery system to utilize radial fans which have their axes mounted vertically, and of course, the outlet mounted air delivery system may utilize axial flow propeller fans, as in the trailer related embodiment set forth in FIGS. 5 and 6.

The refrigeration system of the present invention may use the piping diagrams and electrical control systems shown in the multi-temperature compartmentalized transport refrigeration systems shown in the hereinbefore mentioned U.S. Patents for independently controlling the first and second evaporator units 50 and 52. With the piping diagrams and electrical control of the aforesaid U.S. Patents, one of the two evaporator units would be designated as the "low temperature" evaporator, and it would be capable of conditioning a frozen load in the associated cargo space. The remaining evaporator unit would be designated the "high temperature" evaporator, and it would be capable of conditioning a fresh load in the associated cargo space.

If the refrigeration piping arrangement and electrical control of application Ser. No. 07/646,926, filed Jan. 28, 1991, entitled "Compartmentalized Transport Refrigeration System", which is assigned to the same assignee as the present application, were to be used, which application is hereby incorporated into the specification of the present application by reference, then either of the two evaporator units may condition a fresh or frozen load in their associated cargo spaces 32 and 34, as desired. FIG. 7 is a piping diagram of a refrigeration system 216, which is similar to the refrigeration system of the aforesaid incorporated patent application, except arranged for both evaporator units, such as units 50 and 52, to be mounted on the front wall 24 of a truck or trailer, eliminating the long electrical harness, and the long liquid, hot gas, and suction lines of the aforesaid patent application, which are required when the prior art in-line dual cargo space arrangement is used.

More specifically, refrigeration system 216 may be used with the transport refrigeration systems 12, 12', 120, and 194, with transport refrigeration system 12 being assumed for purposes of example. Transport refrigeration system 12 is controlled by electrical control 60, which is shown in detail in the incorporated patent application. Control 60 includes temperature sensors 218 and 220 respectively disposed to sense the temperature of the air in compartments or cargo spaces 32 and 34, such as by sensing the temperature of the return air indicated by arrows 88 and 90.

Figure 9:
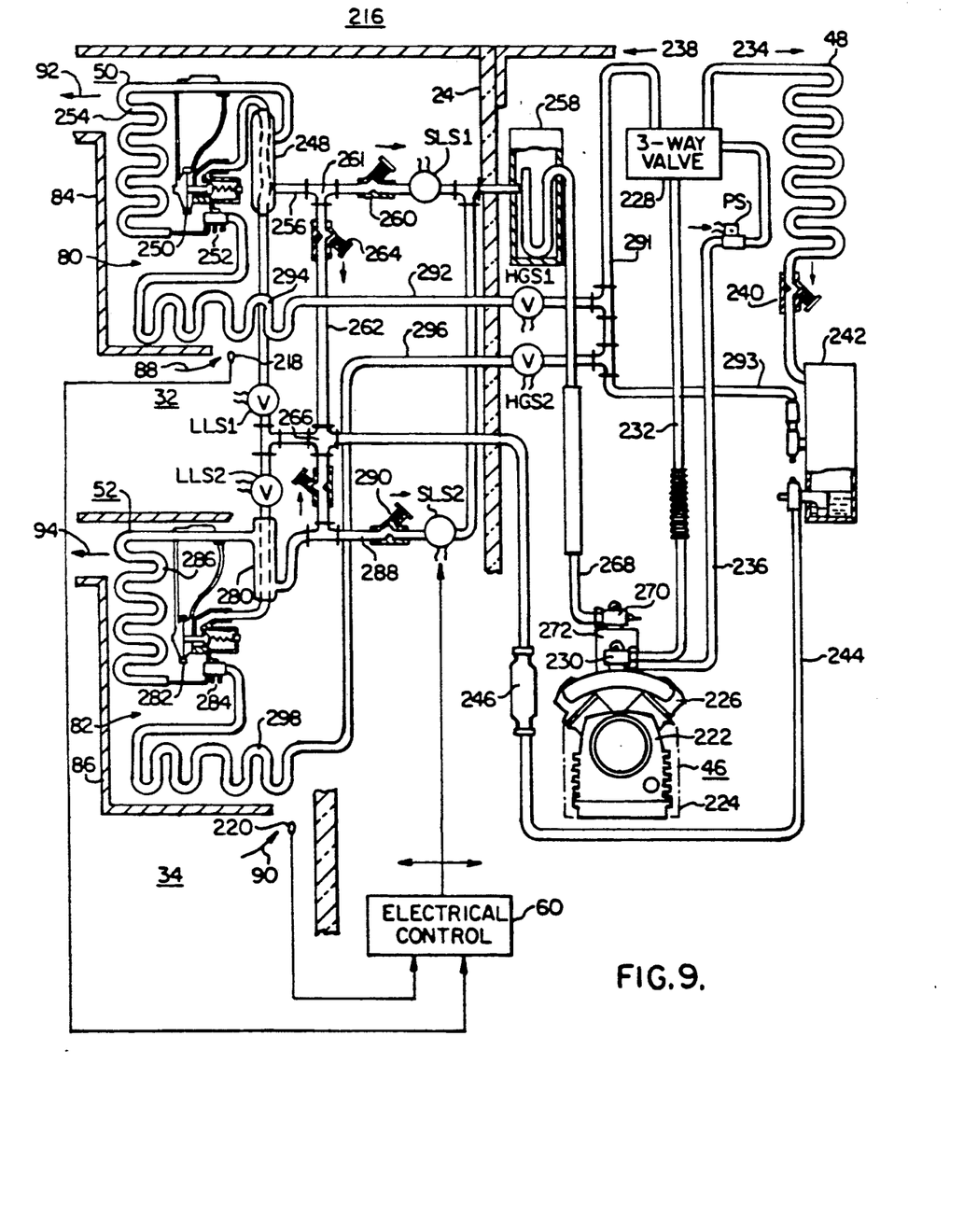
FIG. 9 is a schematic refrigeration piping diagram illustrating a dual temperature transport refrigeration system which may be used in the dual temperature refrigeration units shown in FIGS. 1–8.

The compressor-prime mover package 46 includes a refrigerant compressor 222 driven by a prime mover, such as an internal combustion engine, which may include an auxiliary electric motor, with the prime mover function being indicated generally by broken outline 224. Discharge ports 226 of compressor 222 are connected to refrigeration circuit selecting valve means 228 via a discharge service valve 230 and a hot gas line 232. Valve means 228 may be a three-way valve, as illustrated, or two separate valves, as desired. Three-way valve 228 is controlled by a pilot solenoid valve PS. When valve PS is de-energized, three-way valve 228 is biased to a first position which directs hot refrigerant gas from compressor 222 into a first refrigerant circuit 234. When valve PS is energized, three-way valve 228 is connected to the low pressure side of compressor 222 via conduit 236, operating three-way valve 228 to a second position which directs hot refrigerant gas from compressor 222 into a second refrigerant circuit 238.

The first refrigerant circuit 234 includes the condenser 48, a check valve 240, a receiver 242, a liquid line 244, and a refrigerant drier 246. The first refrigerant circuit 234 may then be connected to either, or both, the first and second evaporator units 50 or 52 via liquid line solenoid valves LLS1 and LLS2, respectively.

The first evaporator unit 50 includes a first path through a heat exchanger 248, an expansion valve 250, a refrigerant distributor 252, an evaporator coil 254, a second path through heat exchanger 248, and a suction line 256 which extends from heat exchanger 248 to an accumulator 258. Suction line 256 includes a check valve 260 and a suction line solenoid valve SLS1. Suction line 256, between the output of heat exchanger 248 and check valve 260, includes a tap 261 and a conduit 262 which includes a check valve 264. Conduit 262 is connected to liquid line 244 via a tap 266.

The accumulator 258 is connected to suction ports of compressor 222 via a suction line 268, a suction line service valve 270, and a suction line throttling valve 272. Accumulator 258, while not essential, assures vaporized refrigerant for compressor 222 in a system and/or an ambient where slugging may be a problem.

The second evaporator unit 52 includes a first path through a heat exchanger 280, an expansion valve 282, a refrigerant distributor 284, an evaporator coil 286, a second path through heat exchanger 280, and a suction line 288 which extends from heat exchanger 280 to the accumulator 258. Suction line 288 includes a check valve 290 and a suction line solenoid valve SLS2.

The first refrigerant circuit 234 is the normal cooling circuit for the first and second evaporator units 50 and 52, removing heat from the first and second cargo spaces 32 and 34, and rejecting heat to ambient via condenser 48.

When an evaporator unit 50 or 52 requires heat for defrosting the associated evaporator coil, or heat for holding a selected set point temperature in the associated cargo space, as detected by temperature sensors 218 and 220, control 60 energizes the pilot solenoid valve PS. Pressure from the low side of compressor 222 now operates three-way valve 228, and valve 228 directs hot compressor gas to the second refrigerant circuit 238. The second refrigerant circuit 238 includes a hot gas line 291 which may be selectively connected to either evaporator unit 50 or 52 via normally closed hot gas solenoid valves HGS1 or HGS2. A receiver pressurizing conduit 293 interconnects hot gas line 291 and receiver 242.

The heating circuit through the first evaporator unit 50 includes a hot gas line 292, a defrost pan heater 294, the refrigerant distributor 252, the evaporator coil 254, the second path through heat exchanger 248, suction line 256, check valve 260, valve SLS1, accumulator 258, and back to compressor 222 via suction line 268.

The heating circuit through the second evaporator unit 52 includes a hot gas line 296, a defrost pan heater 298, the refrigerant distributor 284, the evaporator coil 286, the second path through heat exchanger 280, suction line 288, check valve 290, valve SLS2, accumulator 258, and back to compressor 222 via suction line 268.

In summary, there has been disclosed a new and improved compartmentalized transport refrigeration system 10 which includes a vehicle 14 having side-by-side compartment or cargo spaces 32 and 34 which extend from the front wall 24 of the vehicle 14 to the rear wall 26, with the rear wall 26 having doors 36 and 38 for access to cargo spaces 32 and 34. A dual temperature transport refrigeration unit 12, 12', 120 or 196, which is a single self contained unit charged with refrigerant when manufactured, is mounted on the outside of front wall 24, with first and second evaporator units in air flow communication with cargo spaces 36 and 38 via suitable openings 40 and 42 in the front wall 24. The temperature of the air refrigeration unit, eliminating:

(1) the need for manufacturing and installing a remote evaporator unit, (2) the need for installing and maintaining long refrigeration and electrical lines required to connect a remote evaporator unit with a host refrigeration unit, (3) the need to evacuate and charge host and remote refrigeration units after installation on a vehicle, and (4) the need to manually load a compartment of a compartmentalized vehicle, as both refrigerated compartments are accessible via doors in the rear wall of the vehicle.

What is claimed is:

1. A vehicle having first and second cargo spaces to be conditioned by a transport refrigeration unit, with said vehicle having a bottom (16), a top (18), first and second side walls, a front wall and a rear wall, with a longitudinal axis extending between the front and rear walls, characterized by:

a partition in said vehicle which extends generally parallel with the longitudinal axis of the vehicle, between the front and rear walls, and from the bottom to the top thereof, with said partition providing the first and second cargo spaces of the vehicle, and wherein the transport refrigeration unit (12) includes a frame (44) and first and second evaporator units, said frame and first and second evaporator units being mounted on the front wall of the vehicle, with said first and second evaporator units being in air flow communication with the first and second cargo spaces, respectively, and control means for independently conditioning the air in the first and second cargo spaces via said first and second evaporator units.

2. The vehicle of claim 1, including first and second air delivery means associated with the first and second evaporator units, respectively, with said first and second air delivery means being driven from a common source.

3. The vehicle of claim 2 wherein the first and second air delivery means includes first and second axial flow fans.

4. The vehicle of claim 2 wherein the first and second air delivery means includes first and second radial flow fans.

5. The vehicle of claim 1 wherein each of the first and second evaporator units has first and second opposite sides which respectively function as air input and air output sides, and including a housing disposed about the first and second evaporator units which defines air inlets on the first sides and air outlets on the second sides, and air delivery means disposed between the second sides of the first and second evaporator units and the air outlets of the housing, whereby air is drawn through the evaporator coils and the resulting conditioned air is directly discharged into the first and second cargo spaces by the air delivery means.

6. The vehicle of claim 5 wherein the air delivery means includes first and second radial flow fans having first and second drive shafts, respectively, whose axes are disposed parallel with the longitudinal axis of the vehicle, with said first and second drive shafts extending through the first and second evaporator units, respectively.

7. The vehicle of claim 6 wherein the first and second evaporator units each have first and second split coils disposed one above the other, with the first and second drive shafts extending between the first and second split coils.

8. The vehicle of claim 5 wherein the air delivery means includes first and second radial flow fans having first and second drive shafts whose axes are aligned with one another, perpendicular to the longitudinal axis of the vehicle, and including a universal coupled between the first and second drive shafts having a pulley driven input shaft arrangement disposed between the first and second evaporator units.

* * * * *